United States Patent
Yamamoto et al.

(10) Patent No.: US 6,795,509 B1
(45) Date of Patent: Sep. 21, 2004

(54) METHOD OF RECEIVING SPREAD-SPECTRUM SIGNAL AND RADIO COMMUNICATION TERMINAL DEVICE

(75) Inventors: Katsuya Yamamoto, Tokyo (JP); Masahiko Naito, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/444,413

(22) Filed: Nov. 22, 1999

(30) Foreign Application Priority Data

Nov. 26, 1998 (JP) .......................................... P10-335880

(51) Int. Cl.⁷ ........................... H04B 7/02; H04B 7/216
(52) U.S. Cl. ...................... 375/267; 375/147; 375/148; 375/347; 370/335; 370/340
(58) Field of Search ............................... 375/130, 144, 375/146–147, 148, 262, 267, 347, 348, 349; 370/329, 441, 461–462

(56) References Cited

U.S. PATENT DOCUMENTS

| | | | | |
|---|---|---|---|---|
| 5,490,165 A | * | 2/1996 | Blakeney, II et al. ....... | 370/335 |
| 5,953,364 A | * | 9/1999 | Yamamoto .................. | 375/147 |
| 5,953,382 A | * | 9/1999 | Asano et al. ............... | 375/347 |
| 6,122,311 A | * | 9/2000 | Watanabe et al. ........... | 375/147 |
| 6,154,485 A | * | 11/2000 | Harrison ..................... | 375/130 |
| 6,259,721 B1 | * | 7/2001 | Uesugi et al. .............. | 375/130 |
| 6,282,232 B1 | * | 8/2001 | Fleming, III et al. ....... | 375/147 |
| 6,421,369 B1 | * | 7/2002 | Iwaskai et al. ............. | 375/130 |

FOREIGN PATENT DOCUMENTS

EP 0877493 11/1998 .......... H04B/1/707

* cited by examiner

Primary Examiner—Emmanuel Bayard
Assistant Examiner—Qutub Ghulamali
(74) Attorney, Agent, or Firm—Jay H. Maioli

(57) ABSTRACT

Disclosed herein is a method of receiving a spread-spectrum signal in a radio communication terminal device having a plurality of demodulators for demodulating a received spread-spectrum signal, comprising the steps of detecting when at least one of a plurality of demodulators is temporarily unable to properly demodulate the received spread-spectrum signal, determining whether or not there is a demodulator which is not being used other than the at least one of the demodulators, and continuing a demodulating process of the at least one of the demodulators, if there is a demodulator which is not being used. Thus, according to the present invention, the time in which the demodulator is unlocked is minimized, and a stable, high-quality signal can be received.

3 Claims, 4 Drawing Sheets

METHOD OF RECEIVING SPREAD-SPECTRUM SIGNAL AND RADIO COMMUNICATION TERMINAL DEVICE

BACKGROUND OF THE INVENTION

The present invention relates to a method of receiving a signal in a mobile station in an art of spread spectrum communications, e.g., a method of receiving a signal utilized in a mobile communication system based on the CDMA (Code Division Multiple Access), and more particularly to a method of receiving a signal through RAKE reception using a plurality of demodulators and a radio communication terminal device for carrying out such a method.

Heretofore, in order for a number of mobile stations to share a single base station for communications, various encoding schemes including frequency division, time-division multiplex, and code-division multiple access are used to avoid interference between communication channels of the mobile stations. These encoding schemes have different features of their own, and are selected depending on the purpose of a communication system in which the encoding process is incorporated.

For example, the code division multiple access (hereinafter referred to as CDMA) spreads modulated waves having the same carrier frequency into a frequency band wider than the original frequency band using certain codes, e.g., PN (Pseudo random Noise sequence) codes assigned to respective channels (hereinafter the above process is referred to as spread-spectrum), multiplexes the spread-spectrum modulated waves, and transmits the multiplexed spread-spectrum modulated waves. A received spread-spectrum signal and a PN code given via a channel to be demodulated are synchronized to each other to identify the desired channel.

Specifically, a transmitting station assigns different PN codes to respective channels. The PN codes are pseudo random noise sequence codes. The transmitting station multiplies modulated waves to be transmitted via the respective channels by the different PN codes to spread the modulated waves over a spectrum of frequencies. The modulated waves have been modulated before they are spread. The spread-spectrum modulated waves are then multiplexed and transmitted.

A receiving station despreads the received signals from the transmitting station by synchronizing and multiplying the received signals by the same PN code assigned to the channel to be demodulated. In this manner, only the modulated wave transmitted via the desired channel is demodulated.

According to the CDMA, the transmitting and receiving station can communicate with each other for each call by employing the same code. Since modulated waves are spread using different PN codes assigned to respective channels according to the CDMA, the receiving station can only demodulate a spread-spectrum signal transmitted via the channel to be demodulated. Furthermore, the CDMA is highly effective to secure communication as the PN codes are pseudo random noise sequence codes.

In a mobile communication system based on the CDMA, a transmitting base station repeatedly transmits a PN code as a pilot signal for acquiring and maintaining synchronism in mobile stations and clock signal reproduction. A receiving mobile station detects pilot signals transmitted from a plurality of base stations, and assigns detected timings to respective demodulators. In the mobile station, a PN code is generated in the demodulators. The demodulators multiply the spread-spectrum signal transmitted from a desired base station by the generated PN code at the assigned timing to demodulate the spread-spectrum signal, respectively.

In the mobile communication system based on the CDMA, therefore, the base stations transmit PN codes at different timings as pilot signals. The mobile station detects the timing of the pilot signal supplied from the desired base station, synchronizes the PN code generated in the demodulators with the detected timing, and desperados the received signal using the PN code, for thereby properly demodulating only the spread-spectrum signal transmitted from the desired base station.

The mobile station receives radio waves under conditions that vary momentarily. Practically, the base station and the mobile station hardly communicate directly with each other without any obstacle interposed therebetween. The base station receives radio waves reflected by obstacles such as buildings and the ground, or radio waves reflected by remote mountains.

Therefore, the radio wave received by the mobile station is composed of a combination of plural reflected waves. Since the mobile station moves at varying speeds, the intensity of energy of a signal from the base station that is detected by the mobile station varies momentarily, occasionally resulting in a large attenuation of the received radio wave. Such an environment for radio wave reception is referred to as a fading environment.

The mobile station continuously detects the timings of pilot signals from base stations, and assigns the detected timings (referred to as multipaths) to a plurality of demodulators thereof for signal reception. In the fading environment, since the detected timings are frequently lost or regenerated, the demodulators are often unlocked and timings are often reassigned to the demodulators.

When a demodulator is unlocked, it is general practice to reassign a timing to the demodulator according to the following processing sequence:

(1) The demodulating process of the demodulator is temporarily stopped.
(2) A path (the timing of a PN code) that can be reassigned is selected based on the detected timing from a timing detector.
(3) If a path can be reassigned, then the timing at which the PN code is generated in the demodulator is synchronized with the detected timing.
(4) The demodulating process of the demodulator is permitted.
(5) The demodulator is locked.

According to the above processes, however, it takes a certain period of time before the demodulator is finally locked again for some reasons described below, and the quality of the signal received during such certain period of time is lowered.

(1) Since the demodulating process of the demodulator is temporarily stopped, the reception level of the demodulator is cleared once.
(2) To obtain the resulting detected timing from the timing detector needs to be awaited.
(3) It is time-consuming to select a path that can be reassigned.
(4) It is time-consuming to change into the designated timing in the demodulator.
(5) It takes a certain period of time until a locking threshold is achieved after the demodulating process of the demodulator is started.

Consequently, the mobile communication system based on the CDMA with each mobile station employing a plurality of demodulators has strongly been required to establish a process of receiving stable, high-quality signals.

SUMMARY OF THE INVENTION

It is therefore an object of the present invention to provide a method of stably receiving signals from base stations for producing high-quality received information even in a fading environment where multipaths of detected pilot signals are often lost and regenerated, and a radio communication terminal device for carrying out such a method therein.

It is known in the related art that a path which causes a demodulator to be unlocked is frequently lost and regenerated as it has multipath timing. Therefore, the regeneration of a path at the time the demodulator is unlocked can well be expected.

It has been found as a result of actual measurements that the period of time consumed for re-receiving and re-demodulating a signal which caused the demodulator to be unlocked is shorter than if taking the above processing sequence (1)–(5) to stop the process once for demodulation, though the period of time depends on the period of fading, i.e., the speed of travel of the mobile station terminal device.

In actual reception environments, since new paths are generated and lost momentarily, it is desirable to demodulate a newly detected path with stable strong energy rather than expecting the recovery of a regenerated path.

Therefore, if there is a multipath that can be assigned to a demodulator which has been unlocked, the demodulating process of the demodulator is temporarily stopped, and a new path is assigned to the demodulator, otherwise the recovery of a path which has caused the demodulator to be unlocked is awaited if there is no multipath that can be assigned to a demodulator which has been unlocked. In this manner, it is possible to receive high-quality signals stably.

A method of receiving a spread-spectrum signal and a radio communication terminal device which carries out the method according to the present invention detect when at least one of demodulators which demodulates a received spread-spectrum signal is incapable of properly demodulating the received spread-spectrum signal, and determine whether there is a demodulator which is not being used other than the at least one of the demodulators. If there is a demodulator which is not being used, a demodulating process of the at least one of the demodulators is continued.

If there are not enough paths that can be received and demodulated to be assigned to a plurality of demodulators, then the radio communication terminal device waits until the signal which has caused the demodulator to be unlocked is received again for being demodulated. In this manner, the time in which the demodulator is unlocked is minimized, and a stable, high-quality signal can be received.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

A method of receiving a spread-spectrum signal according to the present invention and a radio communication terminal device for carrying out such a method will be described below with reference to the drawings. In the illustrated embodiment, the method and the radio communication terminal device of the present invention to which the CDMA communication system that has been standardized as the IS-95 system in the U.S.A. is applied will be described by way of example.

Figure 1:
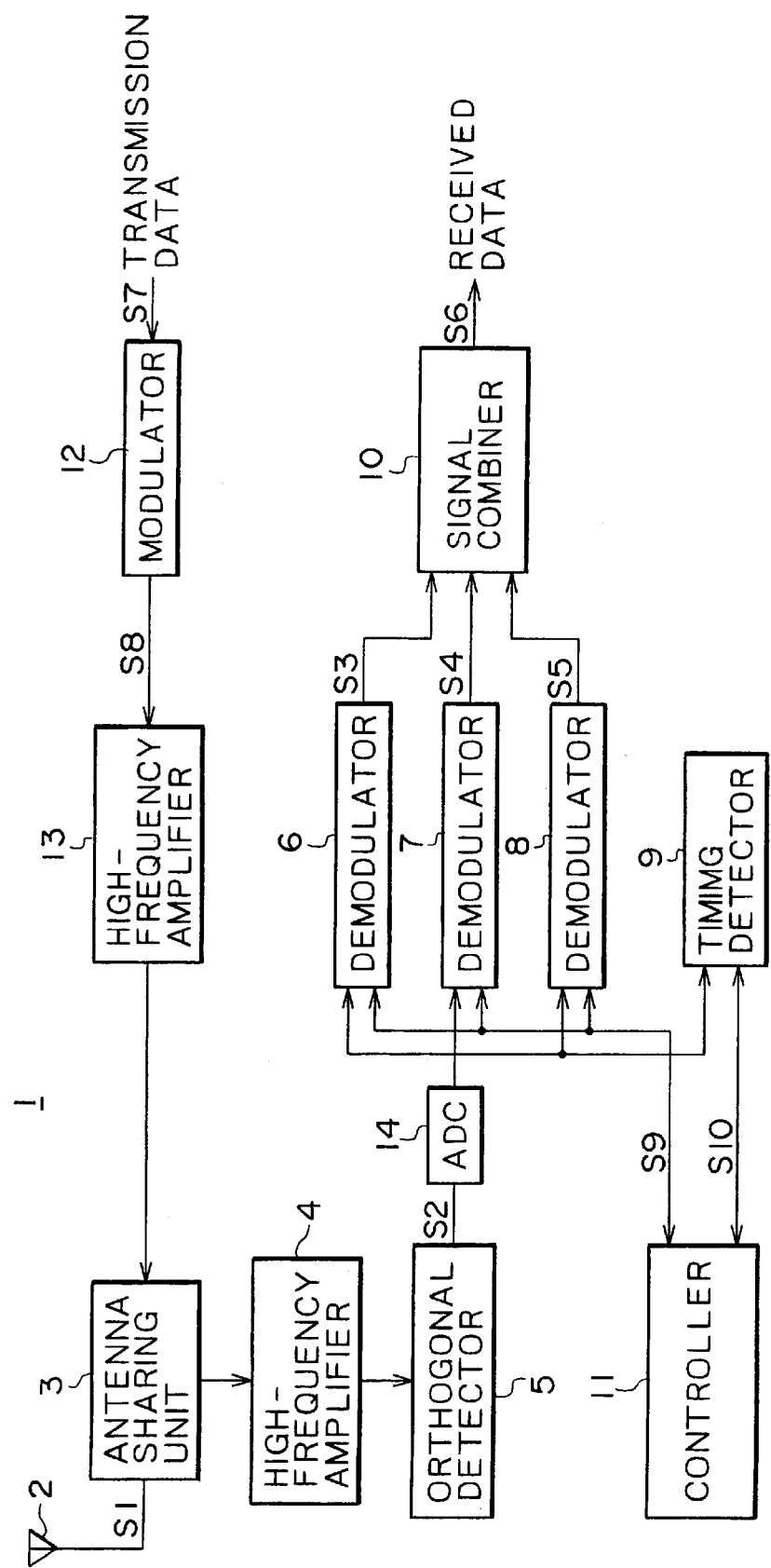
FIG. 1 is a block diagram of a radio communication terminal device according to the present invention.

FIG. 1 shows in block form a radio communication terminal device according to the present invention. The radio communication terminal device of this embodiment can be used outside while moving around, such as a portable telephone set, an automobile telephone set, etc., and will hereafter referred to as a mobile station terminal device.

As shown in FIG. 1, a mobile station terminal device 1 comprises an antenna 2, an antenna sharing unit 3, a high-frequency amplifier 4, an orthogonal detector 5, a plurality of demodulators 6, 7, 8, a timing detector 9, a signal combiner 10, a controller 11, a modulator 12, a high-frequency amplifier 13, and an A/D converter 14. The mobile station terminal device 1 is constructed as a so-called RAKE receiver with the three demodulators 6, 7, 8.

The mobile station terminal device 1 receives signals transmitted from a plurality of base stations according to the CDMA, and demodulates a received signal at the timing of a pilot signal contained in the received signal. Specifically, the mobile station terminal device 1 demodulates only a signal received from a base station which is to be demodulated.

The controller 11 is a microcomputer comprising a CPU, a ROM, a RAM, and a clock circuit. As described later on, the controller 11 manages and controls the statuses of various components of the mobile station terminal device 1.

The mobile station terminal device 1 converts a signal S1 received via the antenna 2 into a baseband signal S2 successively through the antenna sharing unit 3, the high-frequency amplifier 4, and the orthogonal detector 5. The baseband signal S2 is next converted into a digital signal by the A/D converter 14. The digital signal is then supplied from the A/D converter 14 to the demodulators 6, 7, 8 and the timing detector 9.

The timing detector 9 detects pilot signals from the baseband signal S2 transmitted by the base stations. The timings of the pilot signals detected by the timing detector 9 are supplied to the controller 11, which assigns the timings of the pilot signals to the demodulators 6, 7, 8 based on a control signal S9.

The demodulators 6, 7, 8, each generate a PN code at the assigned timings, despreads the baseband signal S2 from the orthogonal detector 5, to thereby demodulate the baseband signal S2 into respective demodulated signals S3, S4, S5, and supplies the demodulated signals S3, S4, S5 to the signal combiner 10.

Specifically, each of the demodulators 6, 7, 8 has a PN code generator for generating a PN code. The demodulators 6, 7, 8 multiply the baseband signal S2 by the generated PN code at the assigned timings mentioned above to demodulate the baseband signal S2. The base stations transmit respective PN codes at their inherent timings. The PN code generated in the mobile station is synchronized with the PN codes transmitted as pilot signals from the base stations, and the baseband signal S2 is demodulated using the synchronized PN code. In this manner, only the signal transmitted from the desired base station can selectively be demodulated.

The signal combiner 10 combines the supplied demodulated signals S3, S4, S5 obtained from multipaths received via a plurality of transmission paths. Since the demodulated signals S3, S4, S5 have been demodulated at the different timings, the signal combiner 10 combines the demodulated signals S3, S4, S5 after synchronizing their timings.

The signal combiner 10 combines the supplied demodulated signals S3, S4, S5 for generating received data S6 having a large signal-to-noise ratio and a large signal-to-disturbance ratio. The received data S6 thus obtained is supplied via an amplifier to a speaker (handset), from which voice/sound from the caller are output.

The above process of combining a plurality of demodulated signals S3, S4, S5 for stably generating high-quality received data S6 is referred to as a RAKE reception.

The mobile station terminal device 1 also has a transmission circuit. In the transmission circuit, transmission data S7 representing voice/sound picked up by a microphone (handset) is supplied to the modulator 12, which modulates the transmission data S7 into a modulated signal S8 by executing spread-spectrum and offset QPSK (Quadrature Phase-Shift Keying) processes. The modulated signal S8 generated by the modulator 12 is amplified by the high-frequency amplifier 13, and the amplified signal is supplied from the antenna sharing unit 3 to the antenna 2, from which the signal is radiated and transmitted.

The timing detector 9 has a pilot signal timing search range (search object window) and a detecting accuracy controlled by a control signal S10 from the controller 11.

If there is only one received signal that can be demodulated, then only one of the demodulators 6, 7, 8 may be used. The controller 11 manages the statuses of the demodulators 6, 7, 8, e.g., determines which one of the demodulators 6, 7, 8 has been assigned with the generated timing of a PN code, which demodulators are not being used, and whether received signals are being demodulated by those demodulators which are being used.

The mobile station terminal device 1 uses the three demodulators 6, 7, 8 efficiently, for thereby stably receiving high-quality signals from the base stations even in the fading environment.

Prior to describing the method of receiving a spread-spectrum signal which is carried out by the mobile station terminal device 1, a locked state of the demodulators 6, 7, 8 which properly demodulates a received signal and an unlocked state of the demodulators 6, 7, 8 which fails to properly demodulate a received signal will be described below.

Figure 2:
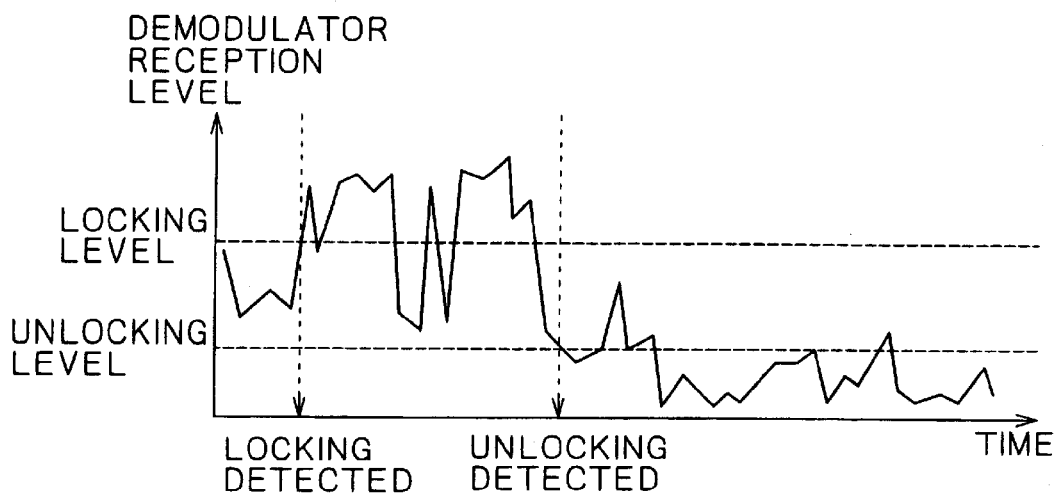
FIG. 2 is a diagram illustrative of the level of a received signal in a demodulator in a fading environment.
Figure 3:
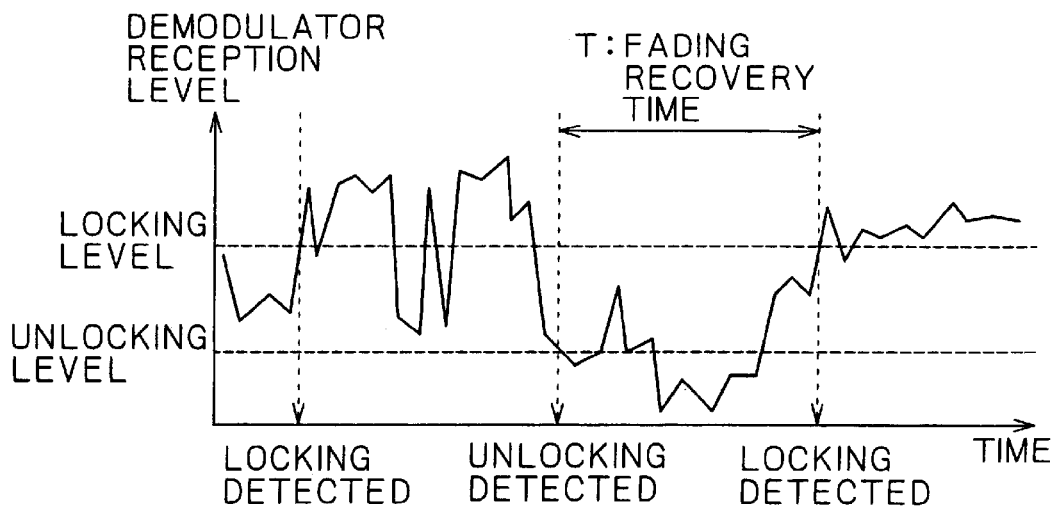
FIG. 3 is a diagram illustrative of the level of a received signal in a demodulator in a fading environment.

FIGS. 2 and 3 illustrate locked and unlocked states of the demodulators 6, 7, 8. As shown in FIG. 2, a locking threshold (referred to as a locking level in FIG. 2) and an unlocking threshold (referred to as an unlocking level in FIG. 2) are set for each of the demodulators 6, 7, 8. When a demodulator is catching a received signal properly, the level of the received signal in the demodulator increases to such an extent in excess of the locking threshold. When the demodulator is catching the received signal properly and the reception level of the demodulator is higher than the locking threshold, the demodulator is referred to as being locked.

When a demodulator has lost a proper received signal, the level of the received signal in the demodulator decreases to such an extent below the unlocking threshold. When demodulator has lost the proper received signal and the reception level of the demodulator is lower than the unlocking threshold, the demodulator is referred to as being locked.

As described above, it is known in the related art that a path which causes a demodulator to be unlocked is frequently lost and regenerated as it has multipath timing. Therefore, the regeneration of a path at the time the demodulator is unlocked can well be expected.

Specifically, as shown in FIG. 3, it has been found as a result of actual measurements that a fading recovery time T, which is the time required for a signal which has caused the demodulator to be unlocked can be received and demodulated again, is shorter than if taken the above processing sequence (1)–(5), though the fading recovery time T depends on the period of fading, i.e., the speed of travel of the mobile station terminal device.

In actual reception environments, since new paths are generated and lost momentarily, it is desirable to demodulate a newly detected path with stable strong energy rather than expecting the recovery of a regenerated path.

In the mobile station terminal device according to the present invention, if the number of received signals that can be demodulated is smaller than the number of the demodulators of the mobile station terminal device, with some of the demodulators being unused, when a demodulator being used is unlocked, the demodulating process of the unlocked demodulator is not stopped, but waits until the received signal which has been demodulated by then can be demodulated again.

Specifically, if the number of received signals that can be demodulated is smaller than the number of the demodulators of the mobile station terminal device, there may not necessarily be a received signal that can newly be demodulated, even if the process (1)–(5) is performed. Therefore, the demodulator which has been unlocked waits for the recovery of a received signal which has been demodulated by the unlocked demodulator. In this fashion, a received signal can be demodulated more stably.

The method of receiving a spread-spectrum signal which is carried out by the mobile station terminal device 1 will be described below with reference to FIGS. 4 and 5.

Figure 4:
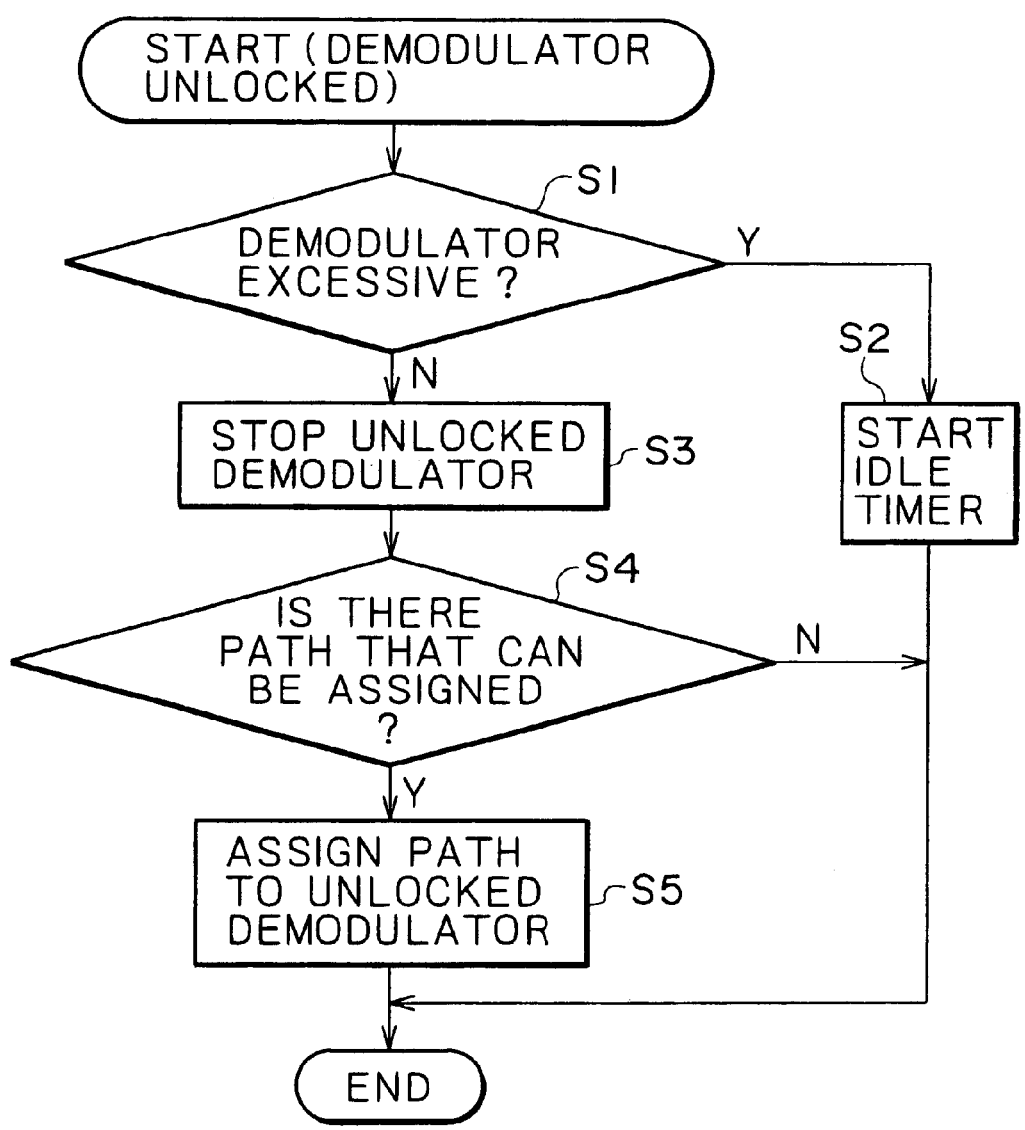
FIG. 4 is a flowchart explaining a processing sequence that is performed when a demodulator is unlocked in the radio communication terminal device shown in FIG. 1.

In the mobile station terminal device 1, the controller 11 executes a processing sequence shown in FIG. 4 when either one of the demodulators 6, 7, 8 is unlocked. First, the controller 11 determines whether or not another demodulator other than the unlocked demodulator is not being used in step S1. For example, when the demodulator 6 is unlocked, the controller 11 checks the demodulating status of the demodulators 7, 8.

In FIG. 1, the timing detector 9 cooperates with the controller 11 in continuously detecting a new path and assigning a detected new path to a demodulator which is not being used. Therefore, when a demodulator is unlocked while another demodulator is not being used, it means that a new path that can be assigned at the time is not at least detected. The method according to the present invention expects such a state that a demodulator which has been unlocked automatically starts to demodulate a received signal again.

If the controller 11 determines that another demodulator is not being used and is excessive, then the controller 11 activates an idle timer using the clock circuit thereof in order to determine an upper limit for the period of time in which to leave the unlocked demodulator idle in step S2. Then, the controller 11 ends the processing sequence shown in FIG. 4. The time measured by the idle timer should be adjusted by measuring the speed of travel of the mobile station terminal device and the time in which a received signal can be recovered for demodulation in the actual reception environments.

If the controller 11 determines that no other demodulator is not being used in step S1, the controller 11 stops the demodulating process of the unlocked demodulator according to the above general process (1)–(5) in step S3, and thereafter determines whether or not there is a path (received signal) that can be assigned in step S4.

If it is determined that there is a path which can be assigned in step S4, then the controller 11 assigns the path to the unlocked demodulator in step S5. Then, the controller 11 ends the processing sequence shown in FIG. 4. If it is determined that there is no path that can be assigned in step S4, then the controller 11 ends the processing sequence shown in FIG. 4.

If the controller 11 determines that a demodulator is excessive in step S1, then the unlocked demodulator remains in the demodulating state until the time measured by the idle timer started in step S2 expires.

Specifically, the controller 11 waits until the unlocked demodulator is capable of receiving the signal which has been demodulated immediately before the demodulator is unlocked and demodulating the received signal properly again. That is, the controller 11 waits until the signal which has been demodulated immediately before the demodulator is unlocked becomes locked again.

If a path that can be assigned is not detected and a demodulator is excessive, since the controller 11 waits until the unlocked demodulator is capable of receiving the signal which it has been demodulating immediately before the demodulator is unlocked and demodulating the received signal properly again, the unlocked demodulator can be locked again quickly, i.e., the unlocked demodulator can automatically start demodulating the received signal.

When the unlocked demodulator is locked before the time measured by the idle timer started in step S2 expires, the idle timer is stopped and reset.

In this manner, the unlocked demodulator is capable of automatically resuming the demodulation of a received signal without control of the controller 11, e.g., assignment of a new path.

Figure 5:
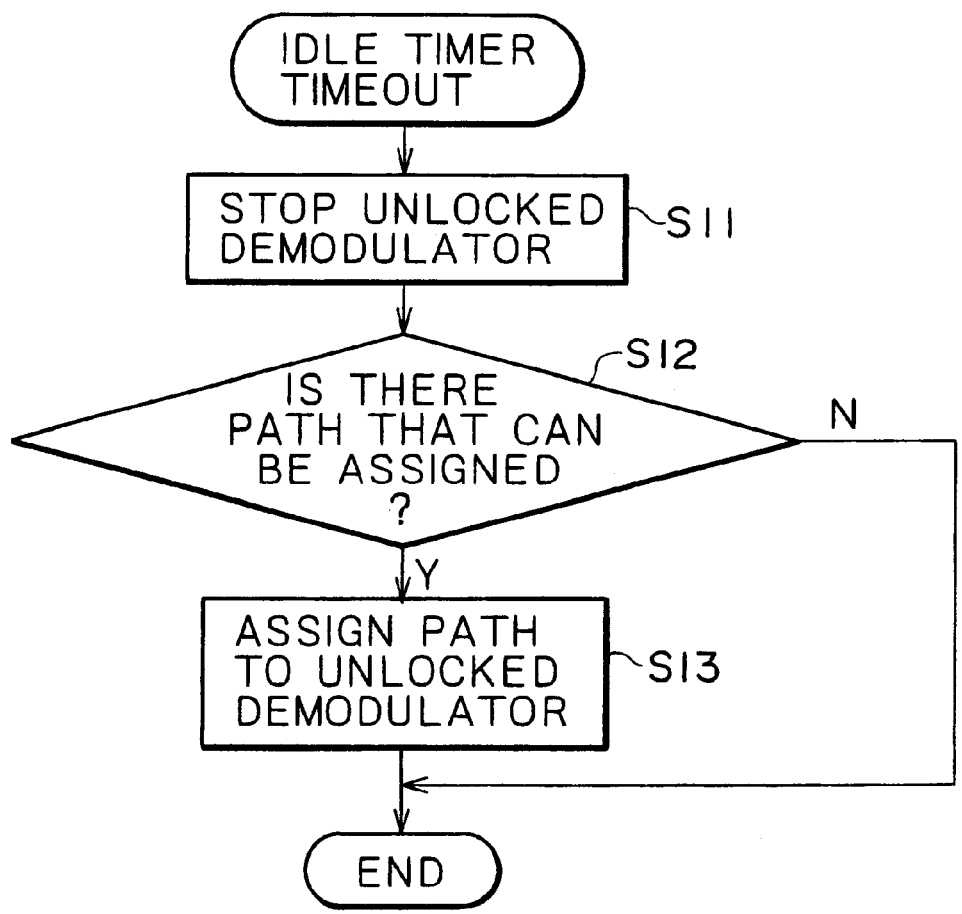
FIG. 5 is a flowchart explaining a processing sequence that is performed when an unlocked demodulator fails to resume its demodulating process on its own after being left idle for a given period of time.

If the unlocked demodulator fails to automatically resume the demodulation of a received signal, i.e., if the unlocked demodulator fails to demodulate again the received signal which has been demodulated immediately before the demodulator is unlocked until the time measured by the idle timer expires, then the controller 11 carries out a processing sequence shown in FIG. 5.

Upon the event of timeout of the idle timer started in step S2 shown in FIG. 4, the controller 11 assigns a new path to the unlocked demodulator and starts demodulating a signal that can be received, according to the above general process (1)–(5).

Specifically, the controller 11 stops the demodulating process of the demodulator which has been unlocked and left idle for a given period of time in step S11, and determines whether or not there is a path (received signal) that can be assigned in step S12.

If there is a path that can be assigned in step S12, then the controller 11 assigns the path to the unlocked demodulator and enables the demodulator to demodulate the received signal in step S13. Then, the controller 11 ends the processing sequence shown in FIG. 5. If there is no path that can be assigned in step S12, then the controller 11 ends the processing sequence shown in FIG. 5.

As described above, the timing detector 9 cooperates with the controller 11 in continuously detecting a new path and assigning a detected new path to a demodulator which is not being used. Therefore, when there is found a demodulator not being used and there is a path that can be assigned, the path that can be assigned is assigned to the demodulator which is not being used.

In the fading environment, it is well expected that a path which has caused a demodulator to be unlocked can be demodulated again at the original timing. Therefore, if there is a demodulator that is not being used among the demodulators of the mobile station terminal device 1, then when one of the demodulators is unlocked, the unlocked demodulator is left idle for a given period of time, and waits until the received signal that has been demodulated immediately before the demodulator is unlocked is recovered. In this fashion, the time in which the demodulator is unlocked is minimized, and a stable, high-quality signal can be received.

If the original received signal cannot be demodulated after the unlocked demodulator has been left idle for the given period of time, then a new path is assigned to the unlocked demodulator to start the demodulating process thereof. Therefore, the unlocked demodulator will not be left idle unduly, but can effectively be utilized.

In the illustrated embodiment, the idle timer uses the clock circuit of the controller 11. However, the idle timer may not be limited to this, and may be in the form of a software-implemented counter.

In the illustrated embodiment, the mobile station terminal device has three demodulators. However, the mobile station terminal device may have four or five demodulators. Stated otherwise, the principles of the present invention are applicable to a so-called RAKE receiver having a plurality of demodulators.

Although a certain preferred embodiment of the present invention has been shown and described in detail, it should be understood that various changes and modifications may be made therein without departing from the scope of the appended claims.

What is claimed is:

1. A method of receiving a spread-spectrum signal in a radio communication terminal device having a plurality of demodulators for demodulating a received spread-spectrum signal, comprising the steps of:

detecting when one of the plurality of demodulators becomes unlocked and is temporarily unable to demodulate a spread-spectrum signal currently being received;

starting an idle timer for a predetermined period of time;

waiting for the predetermined period of time for the one demodulator to become locked and continue to demodulate the spread-spectrum signal currently being received;

determining whether there is an other demodulator that is not being used other than said one demodulator; and continuing a demodulating process of said one demodulator using the other demodulator when it is determined that the other demodulator is not being used and the predetermined period of time has elapsed.

2. The method of receiving a spread-spectrum signal in a radio communication terminal device according to claim 1, further comprising the step of:

determining that each of the plurality of demodulators is incapable of demodulating the received spread-spectrum signal, when a level of an input signal supplied to each of the plurality of demodulators is lower than a predetermined value.

3. A radio communication terminal device for demodulating a received spread-spectrum signal, comprising:

a plurality of demodulators; and control means for monitoring and controlling a respective operating status of said plurality of demodulators; wherein said control means includes:

means for detecting when a level of an input signal supplied to one of said plurality of demodulators that is demodulating the received spread-spectrum signal is lower than a predetermined value so that the one demodulator becomes unlocked;

means for starting an idle time for a predetermined period of time;

means for waiting for the predetermined period of time for the one demodulator to become locked and continue to demodulate the spread-spectrum signal currently being received;

means for determining whether there is an other demodulator that is not being used other than said one demodulator; and means for continuing a demodulating process of said one demodulator using the other demodulator when it is determined that the other demodulator is not being used and the predetermined period of time has elapsed.

* * * * *